3,584,075
POLYURETHANE ADHESIVE BASED ON AN
ALIPHATIC AND AN AROMATIC POLYESTER
Eugen Bock, Leverkusen-Schlebusch, and Manfred Dollhausen, Monheim-Hitdorf, Germany, assignors to Farbenfabriken Bayer Aktiengesellschaft, Leverkusen, Germany
No Drawing. Filed Sept. 4, 1968, Ser. No. 757,493
Claims priority, application Germany, Sept. 21, 1967, F 53,543
Int. Cl. C08g 41/04, 22/10
U.S. Cl. 260—858     3 Claims

ABSTRACT OF THE DISCLOSURE

An adhesive composition especially for rubber, leather, textiles or plastics and most especially for soft polyvinyl chloride. The composition is the reaction product of a diisocyanate with two polyesters, one of which is a benzene dicarboxylic acid alkylene polyester with a molecular weight up to 600, preferably up to 300, while the other polyester is either an alkane diol polycarbonate or an alkane diol dicarboxylic acid polyester with a molecular weight between 600 and 3000, preferably between 1500 and 2500. The preferred first polyester is a polyester made from phthalic acid and ethylene glycol. The second polyester is preferably an adipic acid/butane diol polyester or an adipic acid/hexane diol polyester. If polycarbonate is employed hexane-1,6-polycarbonate is preferred. Toluylene diisocyanate is the typical isocyanate.

---

This invention relates to a polyurethane adhesive and more particularly to solutions of hydroxyl polyurethanes which are capable of forming adhesive films of high cohesive strength.

The use of hydroxyl polyesters and hydroxyl polyurethanes in combination with polyisocyanates as adhesives is known. Thus, adipic acid polyesters and hydroxyl polyurethane, prepared for example, from adipic acid and ethylene glycol or adipic acid and butane-1,4-diol and toluylene diisocyanate or from a reaction product of polyols and excess toluylene diisocyanate can be used together with solution of polyisocyanates, e.g. of 4,4',4''-triphenylmethane triisocyanate or thiophosphoric acid tris-(p-isocyanatophenyl ester) for gluing together many different types of materials, especially flexible materials used in the shoe, textile or packaging industries. The resulting adhesive bonds have high strength both at normal and elevated temperatures.

It is, however, a serious disadvantage that the mixtures of hydroxyl polyesters or hydroxyl polyurethanes and polyisocyanates will keep for only a limited time. The viscosity of the adhesive rises soon after the addition of the polyisocyanate to the polyester or the polyurethane solution, and within a few days at most the mixture has gelled irreversibly and become completely useless. The adhesive therefore has to be prepared on the spot immediately before by mixing the two components, which is a time-consuming operation. This results in a considerable proportion of faulty adhesive bonds, due to inaccurate dosing when small quantities of adhesive are used or to inadequate mixing of the components when larger quantities are prepared. The above-mentioned polyesters are liquid and require the use of a polyisocyanate. Solutions of hydroxyl polyurethanes which are capable of forming adhesive films of high cohesive strength, after evaporation of the solvent, can in principle be prepared as one component substances without the use of polyisocyanate as cross-linking agent, although the adhesive bonds so obtained have a relatively low heat resistance and are practically of little value.

It is therefore an object of this invention to provide an improved polyurethane adhesive which does not have the foregoing disadvantages. Another object of this invention is to provide hydroxyl polyurethanes which have improved storage stability. Still a further object of this invention is to provide hydroxyl polyurethanes which are capable of forming adhesive films of high cohesive strength. A further object of this invention is to provide an adhesive solution of a linear hydroxyl polyurethane suitable for gluing rubber, leather, textiles, synthetic resins or the like. Still another object of this invention is to provide a process for the production of hydroxyl polyurethanes.

The foregoing objects and others which will become apparent from the following description are accomplished in accordance with the invention, generally speaking, by providing solutions of hydroxyl polyurethanes which have been prepared by reacting (a) a hydroxyl-containing polyester of carbonic acid or alkane dicarboxylic acid with an aliphatic diol, said polyester having a molecular weight of 600 to 3000, preferably 1500 to 2500, (b) a hydroxyl-containing polyester of benzene dicarboxylic acid and an aliphatic diol, said polyester having a molecular weight of up to 600 and preferably up to 300, and (c) aromatic or aliphatic diisocyanates. The resulting hydroxyl polyurethanes yield adhesive bonds of high heat resistance when used as one component mixtures without the addition of cross-linking agents.

Both the hydroxyl polyurethanes and the adhesives prepared from them are more stable in storage than the hydroxyl polyurethanes prepared from hydroxyl polyesters of alkane dicarboxylic acid and alkane diol and diisocyanates. The resistance of the adhesive bonds produced with the adhesives according to the invention to moist warm surroundings is also increased to a certain extent.

The present invention thus relates to adhesives which are solutions in inert solvents of linear hydroxyl polyurethanes which have been prepared by reacting hydroxyl-containing polyesters of carbonic acid and an aliphatic diol or of alkane dicarboxylic acid and an aliphatic diol, which polyesters have a molecular weight of 600 to 3000, preferably 1500 to 2500, and hydroxyl-containing polyesters of benzene carboxylic acid and an aliphatic diol, which polyesters have a molecular weight of up to 600 and preferably up to 300, with diisocyanates.

The invention also relates to a process for the preparation of hydroxyl polyurethanes from hydroxyl polyesters and diisocyanates, in which hydroxyl-containing polyesters prepared from carbonic acid or an alkane dicarboxylic acid and an aliphatic diol, having a molecular weight of 600 to 3000, and preferably 1500 to 2500, and hydroxyl-containing polyesters of benzene dicarboxylic acid and an aliphatic diol, having a molecular weight of up to 600 and preferably up to 300, are reacted with diisocyanates. The present invention also relates to linear hydroxyl polyurethanes which are obtainable by this process.

The hydroxyl-containing polyesters of molecular weight 600 to 3000, preferably 1500 to 2500, and, of molecular weight up to 600 and preferably 300, which are required as starting materials for the preparation of the hydroxyl polyurethanes according to the invention can be prepared by known methods from aliphatic dicarboxylic acids, e.g. succinic, adipic, pimelic, suberic, azelaic or sebacic acids or from benzene dicarboxylic acids, i.e., phthalic, isophthalic or terephthalic acids and straight or branched chain aliphatic diols such as ethylene glycol, butane-1,3-diol, butane-1,4-diol, 2,2-dimethylpropane-1,3-diol or hexane-1,6-diol. Aliphatic diols which contain more than three carbon atoms are preferred because the adhesives produced from them are particularly versatile in application and are also eminently suitable for, e.g. gluing soft polyvinyl chloride. The preparation of hydroxyl polyesters of carbonic acid, e.g. hexane-1,6-diol polycarbonate, can also be carried out in known manner, e.g. by reacting hexane-1,6-diol with diarylcarbonates such as diphenylcarbonate.

Any aliphatic diisocyanates are suitable for use according to the process of the invention, e.g. 1,6-hexamethylene diisocyanate, cycloaliphatic diisocyanates such as 1-methyl-cyclohexane-2,4- and -2,6-diisocyanates and mixtures of these isomers, araliphatic diisocyanates such as 1,4-xylylene diisocyanate, aromatic diisocyanates, especially 4,4'-diphenylmethane diisocyanate and 2,4- and 2,6-toluylene diisocyanates and mixtures of these isomers, m- and p-phenylene diisocyanates and 1,5-naphthylene diisocyanate. Mixtures of several diisocyanates may, of course, also be used.

The hydroxyl pulyurethanes according to the invention are usually prepared by reacting the polyester components, i.e. the polyesters of carbonic acid or alkane dicarboxylic acid and polyesters of benzene dicarboxylic acid in a molar ratio of 25:1 to 1:5, at an elevated temperature, e.g. in the region of 100 to 160° C., with the diisocyanate in a molar ratio of about 1:1, based on the polyester mixture, but the amounts should be such that a very slight excess of hydroxyl groups is present. If the hydroxyl polyester of benzene dicarboxylic acid is used exclusively or in amounts exceeding the given molar ratio, hard, very brittle products are produced which are completely useless as a flexible adhesive. In order to avoid undesired branching reactions, the hydroxyl polyesters used should be anhydrous. They can be carefully freed from water before the reaction by known processes, for example by azeotropic distillation with benzene.

The resulting hydroxyl polyurethanes according to the invention are relatively soft products which in most cases harden to form products of high Shore hardness as a result of crystallization which occurs at room temperature. Such products which can crystallize, are obtained especially when aliphatic dicarboxylic esters with a molecular weight about 1500 are used, and are especially valuable as adhesives and are therefore to be preferred. The adhesives obtained in this way set very rapidly and the resulting adhesive bonds are particularly strong. Suitable solvents used for the hydroxyl polyurethanes are conventional inert solvents, e.g. chlorinated hydrocarbons such as methylene chloride or trichloroethane, esters such as ethyl acetate, or ketones such as acetone or methyl ethyl ketone. The resulting solutions can be used directly as adhesives in many different fields, e.g. in the shoe, textile or packaging industries for gluing together materials of widely different types such as rubber, leather, textile, wood, paper, metal or synthetic resin.

The adhesives according to the invention are advantageously used for gluing rubber, leather, textiles or synthetic resins and especially soft polyvinyl chloride together or to other materials.

Other high molecular weight compounds, e.g. nitrocellulose, or acetyl cellulose, chlorinated polyolefines, chlorine rubber, copolymers of vinyl chloride and vinyl acetate, resins such as colophony derivatives, phenol resins, ketone resins and phthalate resins, fillers such as silicates or dyes may, of course, also be added to the adhesives according to the invention to modify their adhesive properties and adapt them to the particular purpose for which they are to be used.

To produce the adhesive bonds, the adhesives are applied to the surfaces of material to be joined, which may first have been roughened or prepared in some other manner. The adhesives can be applied by means of rollers, brushes, spatulas, spray guns or any suitable device. Before the layers of adhesive are joined together under suitable contact pressure, they are left open until the solvent contained in them has largely evaporated. Solidified layers of adhesive which are already solvent-free may be reactivated, i.e., made sticky again, by heating to 80 to 100° C., e.g. by infrared radiation. If layers of adhesive have solidified, or also in other cases, one of the materials to be bonded, e.g. softened polyvinyl chloride heated to 150 to 180° C. may be applied in liquid form to the layers of adhesive, the liquid material then solidifies on the layer of adhesive to form a firm bond.

The invention is further illustrated by the following examples in which parts are by weight unless otherwise specified.

EXAMPLE 1

About 59.58 g. of toluylene diisocyanate (2,4- and 2,6-isomers mixture in the ratio of 65:35) are added to about 200.0 g. of a polyester of adipic acid and butane-1,4-diol of OH number 48.0 and about 144.33 g. of a polyester of phthalic acid and ethylene glycol of OH number 199.5 at about 85° C., and the mixture is heated at about 140° C. for about 10 hours until the reaction has proceeded to completion. The reaction product is then dissolved in methyl ethyl ketone and the viscosity of the solution is adjusted to 50 poises, measured in a Brookfield viscosimeter at 20° C.

Test samples are prepared by painting this solution of adhesive on strips of soft polyvinyl chloride of the following composition:

about 70 parts by weight of polyvinyl chloride of K-value 80
about 30 parts by weight of dioctylphthalate
about 5 parts by weight of epoxidized soya bean oil
about 1.2 parts by weight of barium-cadmium laurate which have been sanded with a sanding belt of grain 40.

At each end of each strip which measures 8 x 2 x 0.4 cm., 4 cm.$^2$ are left free of adhesive so that the test sample can be clamped into the testing apparatus.

After the adhesive has dried and been activated at about 80 to about 100° C., the strips are combined two by two under a continuous contact pressure of 3 kg./cm.$^2$ lasting about 5 minutes to form a test sample.

After the samples have been stored for about 4 weeks at about 20° C., the adhesive bonds produced in this way are tested in a brief creep strength test at about 50° C., in each case under varying loads (250, 0.5, 1.0, 1.5 and 2.0 kg./cm. of separating width of the adhesions) for a time of up to about 180 minutes. The adhesive bonds produced according to the example withstood 180 minutes of a separating load of 0.25 kg./cm. and 27 minutes of a separating load of 0.5 kg./cm.

In comparative tests carried out with a solution of a hydroxyl polyurethane which had been prepared without the use of a benzene dicarboxylic acid polyester from an adipic acid/butane-1,4-diol polyester of OH number 48 and toluylene diisocyanate (2,4- and 2,6-isomeric mixture in the ratio of 65:35), the adhesive bonds withstood 37 minutes of a separating load of 0.25 kg./cm. and 9 minutes of a separating load of 0.5 kg./cm.

EXAMPLE 2

About 300.0 g. of an adipic acid/butane-1,4-diol polyester of OH number 48, about 58,74 g. of an isophthalic acid/ethylene glycol polyester of OH number 245 and about 44.67 g. of toluylene diisocyanate according to Example 1 were reacted together at about 140° C.

Adhesive bonds between polyvinyl chloride produced according to Example 1 using a solution of viscosity 50 poises prepared from this reaction product and methyl ethyl ketone withstood 180 minutes of a separating load of 0.25 and 0.5 kg./cm. They separated after 173 minutes at 0.75 kg./cm. and after 35 minutes at 1.0 kg./cm.

EXAMPLE 3

About 350 g. of adipic acid/butane-1,4-diol polyester of OH number 51.7, about 4.10 g. of terephthalic acid/ ethylene glycol polyester of OH number 440.9 and about 30.88 of toluylene diisocyanate according to Example 1 where reacted at about 140° C.

Adhesive bonds between polyvinyl chloride produced according to Example 1 using a solution of viscosity 50 poises prepared from this reaction product and methyl ethyl ketone withstood 180 minutes of a separating load of 0.25, 0.5 and 0.75 kg./cm. They separated at 1.0 kg. after 80 minutes.

EXAMPLE 4

About 350.0 of an adipic acid/butane-1,4-diol polyester, OH number 51.7, about 4.10 g. of terephthalic acid/ethylene glycol polyester of OH number 440.9 and about 29.81 of hexamethylene-1,6-diisocyanate were reacted together at about 140° C.

Adhesive bonds between polyvinyl chloride produced according to Example 1 using a solution of viscosity 50 poises prepared from this reaction product and methyl ethyl ketone withstood 180 minutes of a separating load of 0.25 kg./cm. They separated after 108 minutes at 0.5 kg./cm. and after 7 minutes at 0.75 kg./m.

EXAMPLE 5

About 300.0 g. of adipic acid/butane-1,4-diol polyester, OH number 47.55, about 3.88 g. of terephthalic acid/ethylene glycol polyester, OH number 440.9, and about 40.79 g. of 4,4'-diphenylmethane diisocyanate were reacted together at about 140° C.

Adhesive bonds between polyvinyl chloride produced according to Example 1 using a solution of viscosity 50 poises prepared from this reaction product and methyl ethyl ketone in each case withstood 180 minutes of a separating load of 0.25, 0.5 and 0.75 kg./cm. They separated after 174 minutes at 1.0 kg./cm. and after 32 minutes at 1.5 kg./cm.

EXAMPLE 6

About 300.0 g. of adipic acid/butane-1,4-diol polyester of OH number 51.25, about 53.26 g. of phthalic acid/ethylene glycol polyester of OH number 288.5 and about 47.69 of toluylene diisocyanate were reacted together at about 140° C. as in Example 1.

Adhesive bonds between polyvinyl chloride produced according to Example 1 using a solution of viscosity 50 poises prepared from this reaction product and methyl ethyl ketone withstood 180 minutes of a separating load of 0.25 kg./cm. They separated after 169 minutes at 0.5 kg./cm. and 20 minutes at 0.75 kg./cm.

EXAMPLE 7

About 250.0 g. of adipic acid/butane-1,4-diol polyester OH number 79.75, about 134.9 g. phthalic acid/ethylene glycol polyester of OH number 276.5 and about 77.17 g. of toluylene diisocyanate according to Example 1 were reacted together at about 140° C.

Adhesive bonds between polyvinyl chloride produced according to Example 1 using a solution of viscosity 50 poises prepared from this reaction product and methyl ethyl ketone withstood 180 minutes of a separating load of 0.25 kg./cm. They separated after 169 minutes at 0.5 kg./cm. and 29 minutes at 0.75 kg./cm.

EXAMPLE 8

About 300.0 g. of adipic acid/hexane-1,6-diol polyester of OH number 136.5, about 49.36 g. of phthalic acid/ethylene glycol polyester of OH number 276.5 and about 84.72 g. of toluylene diisocyanate according to Example 1 were reacted together at about 140° C.

Adhesive bonds between polyvinyl chloride produced according to Example 1 using a solution of viscosity 50 poises prepared from this reaction product and methyl ethyl ketone withstood 180 minutes of a separating load of 0.25 kg./cm. They separated after 114 minutes at 0.5 kg./cm. and after 7 minutes at 0.75 kg./cm.

EXAMPLE 9

About 200.0 g. of adipic acid/hexane-1,6-diol polyester, OH number 136.5, about 89.71 g. of phthalic acid/ethylene glycol polyester of OH number 276.5 and about 84.73 g. of toluylene diisocyanate according to Example 1 were reacted together at about 140° C.

Adhesive bonds between polyvinyl chloride produced according to Example 1 using a solution of viscosity 50 poises prepared from this reaction product and methyl ethyl ketone withstood 180 minutes of a separating load of 0.25 and 0.5 kg./cm. They separated after 36 minutes at 0.75 kg./cm.

It is to be understood that the foregoing working examples are given for the purpose of illustration and that any other suitable organic diisocyanate, benzene dicarboxylic acid alkylene polyester or polyester which is an alkane diol polycarbonate or an alkane diol dicarboxylic acid polyester may be used therein provided that the teachings of this disclosure are followed.

Although the invention has been described in considerable detail for the purpose of illustration, it is to be understood that variations can be made by those skilled in the art without departing the spirit of the invention and scope of the claims.

What is claimed is:

1. An adhesive of a substantially linear hydroxyl polyurethane prepared by a process which comprises reacting substantially simultaneously in an inert organic solvent an organic diisocyanate with (1) an hydroxyl polyester of carbonic acid and an aliphatic diol or an hydroxyl polyester of an aliphatic dicarboxylic acid and an aliphatic diol, said polyester having a molecular weight of from about 600 to about 3000 and (2) an hydroxyl polyester of a benzene dicarboxylic acid and an aliphatic diol, said polyester having a molecular weight of up to about 600.

2. The adhesive of claim 1 wherein said first-named polyester has a molecular weight of about 1500 to 2000.

3. The adhesive of claim 1 where in said second-named polyester has a molecular weight of up to 300.

References Cited

UNITED STATES PATENTS

| | | | |
|---|---|---|---|
| 2,729,618 | 1/1956 | Mueller et al. | 260—75 |
| 2,999,844 | 9/1961 | Mueller et al. | 260—47 |
| 3,341,498 | 9/1967 | Skreckoski | 260—75 |
| 3,380,950 | 4/1968 | Blomeyer | 260—31.2 |

DONALD E. CZAJA, Primary Examiner

H. S. COCKERAM, Assistant Examiner

U.S. Cl. X.R.

117—138.8, 161; 260—3.3, 13, 24, 31.2, 32.8, 33.8, 37, 47, 63, 75, 77.5, 85.9